United States Patent [19]
Luft et al.

[11] Patent Number: 5,756,616
[45] Date of Patent: May 26, 1998

[54] PROCESS FOR THE PRODUCTION OF POLYOLEFINS AND A CATALYST FOR CARRYING OUT THE PROCESS

[75] Inventors: Gerhard Luft, Mühltal; Brigitte Batarseh, Seeheim-Jügenheim; Maximilian Dorn, Grünwald, all of Germany

[73] Assignee: Peroxid-Chemie GmbH, Pullach, Germany

[21] Appl. No.: 687,479
[22] PCT Filed: Feb. 2, 1995
[86] PCT No.: PCT/EP95/00381
§ 371 Date: Aug. 5, 1996
§ 102(e) Date: Aug. 5, 1996
[87] PCT Pub. No.: WO95/21200
PCT Pub. Date: Aug. 10, 1995

[30] Foreign Application Priority Data
Feb. 4, 1994 [DE] Germany ............ 44 03 523.3

[51] Int. Cl.$^6$ .................. C08F 4/34; C08F 2/02; C08F 110/02
[52] U.S. Cl. .......... 526/184; 526/227; 526/308; 526/352; 502/152; 502/160
[58] Field of Search ............ 526/184, 227; 502/152, 160

[56] References Cited

U.S. PATENT DOCUMENTS

| | | | |
|---|---|---|---|
| 3,156,675 | 11/1964 | Ehmann et al. | 526/184 |
| 3,198,780 | 8/1965 | Mortimer et al. | 526/184 |
| 3,579,491 | 5/1971 | Carrega | 526/184 |

Primary Examiner—Fred Teskin
Attorney, Agent, or Firm—Felfe & Lynch

[57] ABSTRACT

For the production of polyolefins by polymerization of α-olefins in the presence of a peroxide catalyst a catalyst system is used as the catalyst which is composed of the components (A) and (B) in which:

(A) denotes at least one compound selected from the group of organoaluminium compounds of formula AlR3 in which R represents an alkyl, alkenyl, aryl or cycloalkyl group; and (B) denotes at least one organic peroxide.

12 Claims, No Drawings

PROCESS FOR THE PRODUCTION OF POLYOLEFINS AND A CATALYST FOR CARRYING OUT THE PROCESS

BACKGROUND OF THE INVENTION

The invention concerns a process for producing polyolefins by polymerizing an α-olefin in the presence of a peroxide catalyst and a catalyst for carrying out this process.

Processes are known for the production of polyolefins by polymerizing α-olefins in the presence of a peroxide catalyst.

DE-A-3322329 describes a process for the production of polyethylene by polymerization of ethylene and a copolymerizable monomer in the presence of a catalyst composed of a transition metal derivative and an organoaluminium derivative in which an organic peroxide is added to the polymerization product when it is led away from the reaction zone in order to thereby deactivate the remaining catalyst.

JP-B-79031039 describes the (co)polymerization of aliphatic α-olefins using a catalyst system which is composed of trialkylaluminium, an electron donor and a peroxide.

D. Yatsu et al., American Chemical Society, Division of Polymer Chemistry, Polymer Preprints, Vol. 16, No. 1, April 1975, pages 373 to 378 describe the copolymerization of ethylene and vinyl acetate in the presence of a three component catalyst system composed of AlEt3, a Lewis base and a peroxide.

The object of the present invention is to provide an economic process for the polymerization of α(-olefins in the presence of a peroxide catalyst with which it is possible to achieve an improvement in the polymer yield per unit of peroxide weight used.

This object is achieved with the present invention.

THE INVENTION

The invention concerns a process for the production of polyolefins by polymerization of α(-olefins in the presence of a peroxide catalyst. The catalyst system is composed of components (A) and (B) wherein:

(A) denotes at least one compound selected from the group of organoaluminium compounds of formula AlR3 in which R represents an alkyl, alkenyl, aryl or cycloalkyl group; and (B) denotes at least one organic peroxide.

A further subject matter is a catalyst system for use in a process for the production of polyolefins by homopolymerization of a α-monoolefins or alicyclic monoolefins in mass e.g. for use in the process according to the invention which is characterized in that it is composed of the components (A) and (B) in which:

(A) denotes at least one compound selected from the group of organoaluminium compounds of formula AlR3 in which R represents an alkyl, alkenyl, aryl or cycloalkyl group; and (B) denotes at least one organic peroxide.

The polymerization is preferably carried out at a pressure of ≧500 bar and preferably between 500 and 3000 bar. The polymerization temperature is preferably between 0 and 300° C. and preferably between 100 and 250° C.

In the catalyst system composed of components (A) and (B), the amount of component (A) is preferably ca. 0.001 to 100 mol, calculated as monomeric organoaluminium compound relative to 1 mol of the monomer used. The amount of the catalyst component (B) is preferably ca. 0.01 to 100 mol per mol of the catalytic component (A).

The polymerization can be carried out in a well-known manner for the polymerization of α-olefins in the presence of a catalyst, in particular in the presence of a peroxide catalyst and the polymer can be isolated in a well-known manner. In general the polymerization is carried out in mass. The polymerization is a homopolymerization.

Surprisingly it was found that when using the catalyst system according to the invention, the peroxide consumption in the polymerization of α-olefins initiated by organic peroxides can be lowered i.e. the polymer yield per unit of peroxide weight can be considerably improved.

The catalyst system composed of the catalytic components (A) and (B) is added to the monomers as a substance or in solution in which the individual catalytic components (A) and (B) can be added separately. In this process the catalyst components can be fed into the reaction zone at the same time or continuously at a low concentration; specifically the components can be added as such or in solution.

The reaction can be carried out continuously or discontinuously. The well-known reactor types for such a polymerization come into consideration as reactor types such as e.g. flow tube, stirred vessel, stirred vessel cascade and similar reactor types.

The α(-olefin is an α-monoolefin. Examples of this are in particular aliphatic α(-monoolefins with 2 to 8 carbon atoms such as e.g. ethylene, propylene, butene, pentene or hexene or alicyclic monoolefins with 5 to 8 carbon atoms such as e.g. cyclohexene or cyclopentene.

In the catalyst component (A), the residue R denotes an alkyl, alkenyl, aryl or cycloalkyl group with preferably 1 to 30 carbon atoms, in particular 1 to 14 and primarily 1 to 7 carbon atoms. Typical examples for residues R are alkyl groups e.g. methyl, ethyl, butyl, hexyl, heptyl, octyl, dodecyl, but also higher and in particular linear alkyl groups; alkenyl groups such as e.g. allyl; aryl groups such as e.g. phenyl or tolyl; aralkyl groups such as benzyl; and cycloalkyl groups such as e.g. cyclohexyl.

The following are mentioned as typical examples of organoaluminium compounds AlR3: trimethyl-, triethyl-, tributyl-, trihexyl-, trioctyl-, tridodecyl-, triphenyl-, tritolyl- or tribenzyl-aluminium and mixed organo-aluminium compounds such as for example a mixture of triethyl- and tributyl-aluminium or of triethyl- and tribenzyl-aluminium.

The compounds of components (A) and the peroxides of component (B) can be added alone or in a mixture of 2 or several components of the same group and/or also as a mixture of one or several components of the same group with one or several components of the other group.

The organic peroxide which is preferably used as the catalyst component (B) is one which is known for the initiation of such polymerization reactions of α-olefins. Diacylperoxides with 4 to 18 carbon atoms and peresters with 5 to 15 carbon atoms are preferably used. Isobutyrylperoxide, lauroylperoxide and benzyolperoxide can be mentioned as typical examples of diacylperoxides; examples of peresters are tert.-butylperpivalate, tert.-butylperneodecanoate and tert.-butylper-2-ethyl-hexanoate. Peroxymonocarbonates such as e.g. tert.-butylperoxyethylhexylcarbonate have also proven to be well-suited for the process according to the invention.

It is now intended to elucidate the invention in more detail by the following examples without limiting it thereto. The following abbreviations are used in the examples:

TBPEH: tert.-butylper-2-ethylhexanoate
TBPND: tert.-butylperneodecanoate
TBPPI: tert.-butylperpivalate
TDDA: tridodecylaluminium TEA: triethylaluminium
C: conversion

EXAMPLE 1

The reaction was carried out in a continuously operated stirred tank autoclave the stirrer of which was composed of 2 propellers, the blades of which were turned in opposite directions. Heating was by induction. The reaction temperature was monitored by means of a thermoelement. The pressure regulation was carried out by means of PID control.

A solution of triethylaluminium in absolute heptane (4% by weight) was used and butylperpivalate in absolute heptane (2% by weight) as the peroxide compound. The solutions of the components were dosed into the reaction vessel by means of screw piston pumps. Previously all parts of the plant were filled thoroughly with argon. The ethylene was added without a solvent by means of a gas compressor.

The reaction was started by simultaneous adding ethylene and the solutions of the catalyst components. The mass flows of the individual starting materials were 0.1413 g/s for ethylene, $4.344 \times 10^{-5}$ g/s for tert.-butylper-pivalate and $2.535 \times 10^{-5}$ g/s for triethylaluminium.

The process was carried out at a reaction temperature of 155° C., a reaction pressure of 1500 bar and with an average residence time of 60 seconds. The reaction was carried out for 20 minutes. The product of the last 10 minutes was collected and dried in a vacuum. The conversion was 17%. The polymer had a number average of 25 000 and an average molar mass of 36 000 g/mol.

EXAMPLES 2 to 9

The procedure was as stated in example 1 using the catalyst components (A) and (B) and polymerization conditions as stated in the following Table 1. The results obtained are also given in Table 1.

If not stated otherwise the following reaction conditions were used:

The peroxides were used in a solution of absolute heptane (2% by weight) and added continuously to the polymerization vessel at a concentration of 50 molppm.

The organoaluminium compounds were added in a solution of absolute heptane (4% by weight).

The details in mol refer to the monomer used.

The average retention time was 60 seconds.

The polymers obtained were examined by gel-permeation chromatography. Trichlorobenzene was used as the solvent. The number average was determined by calibration with a a polystyrene standard. The average molar mass was determined by light scattering.

TABLE 1

| Example | Monomer (% by weight) | Catalyst component A (mol ppm) | Catalyst component B | Reaction conditions T(°C.) | P(bar) | Polymer formed C (%) |
|---|---|---|---|---|---|---|
| 2 | ethylene (99) | TEA (25) | TBPPI | 125 | 1500 | 14 |
| 3 | ethylene (99) | TEA (25) | TBPPI | 155 | 1500 | 19 |
| 4 | ethylene (99) | TEA (25) | TBPPI | 185 | 1500 | 17 |
| 5 | ethylene (99) | TEA (25) | TBPPI | 155 | 1000 | 20 |
| 6 | ethylene (99) | TEA (25) | TBPPI | 155 | 1700 | 20 |
| 7 | ethylene (99) | TEA (25) | TBPEH | 155 | 1500 | 20 |
| 8 | ethylene (99) | TEA (25) | TBPND | 155 | 1500 | 22 |
| 9 | ethylene (99) | TDDA (50) | TBPPI | 155 | 1500 | 17 |

It will be understood that the specification and examples are illustrative but not limitative of the present invention and that other embodiments within the spirit and scope of the inventions will suggest themselves to those skilled in the art.

We claim:

1. A process for producing a polyolefin by mass polymerization of α monoolefins or alicyclic monoolefins of from 5 to 8 carbon atoms, comprising catalyzing mass homopolymerization of said α monoolefins or alicyclic monoolefins with a catalyst system which comprises at least one organoaluminum compound of formula AlR3, wherein R is an alkyl, alkenyl, aryl or cycloalkyl group, and a compound selected from the group consisting of tert-butylperpivalate, tert.-butylper-2-ethylhexanoate, and tert.-butylperneodeconate.

2. The process of claim 1, comprising homopolymerizing said α-monoolefins or alicyclic monoolefins at a pressure of ≧500 bar.

3. The process of claim 1, comprising homopolymerizing at a temperature of from 0° C. to 300° C.

4. The process of claim 1, wherein said α-monoolefins are aliphatic monoolefins of from 2 to 8 carbon atoms.

5. The process of claim 1, wherein said organoaluminium compound is present in an amount ranging from 0.001 to 100 moles, calculated as monomeric organoaluminum compound, per mole of monoolefin.

6. The process of claim 1, wherein said tert butylperpivalate is present in an amount ranging from about 0.01 moles to about 100 moles per mole of AlR3.

7. The process of claim 1, wherein said AlR3 is present in an amount ranging from 0.001 to 100 moles, calculated as AlR3, per mole of monoolefin and said tert peripivalate is present in an amount from 0.1 to 100 moles per mole of AlR3.

8. The process of claim 1, wherein said compound is tert.-butylperipivalate.

9. The process of claim 1, wherein said compound is tert.-butylper-2-ethylhexanoate.

10. The process of claim 1, wherein said compound is tert.-butylperneodecanoate.

11. A catalytic system useful in homopolymerizing α monoolefins, or alicyclic monoolefins of 5 to 8 carbon atoms, comprising:

at least one organoaluminum compound of formula AlR3, wherein R is an alkyl, alkenyl, aryl, or cycloalkyl group, and tert-butylperpivalate.

12. The catalyst system of claim 11, wherein said tert-butylperpivalate is present at 0.01 to 100 moles per mole of AlR3.

* * * * *

UNITED STATES PATENT AND TRADEMARK OFFICE
CERTIFICATE OF CORRECTION

PATENT : 5,756,616          Page 1 of 3

DATED : May 26, 1998

INVENTOR(S): Gerhard Luft et al.

It is certified that error appears in the above-identified patent and that said Letters Patent is hereby corrected as shown below:

In the cover page, line 30, under the section titled Foreign Application Priority Data, after Germany entry, add the following:
- - Sept. 2, 1974 [AL] Japan ..... 4592144 - -.
- - Feb. 21, 1962 [AM] Belgium ..... 607368 - -.
- - 1974 [AN] Japan ..... 4932671 - -.

In column 1, line 31 delete parenthesis in "a(-olefins" to read as - - a-olefins - -.

In column 1, line 39, change "polymerization" to read as - - homopolymerization - -.

In column 1, line 39, change "a(-olefins" to read as - - a-monoolefins - -.

In column 1, line 39, insert "or alicyclic monoolefins in mass" before "in the presence of peroxide catalyst" to read as - - or alicyclic monoolefins in mass in the presence of peroxide catalyst - -.

UNITED STATES PATENT AND TRADEMARK OFFICE
CERTIFICATE OF CORRECTION

PATENT : 5,756,616
DATED : May 26, 1998
INVENTOR(S) : Gerhard Luft et al.

It is certified that error appears in the above-identified patent and that said Letters Patent is hereby corrected as shown below:

In column 1, line 59, change "≥ 500" to read as ≥ 50 Mpa (≥ 500 bar) - -.
In column 1, line 59, change "500 and 3000 bar" to read as
- - 50 and 300 Mpa (500 and 3000 bar). - -.
In column 1, line 59, insert a new paragraph at the sentence beginning with "The".
In column 2, line 24, delete parenthesis in "a(-olefins" to read as - -a-olefins - -.
In column 2, line 25, delete parenthesis in "a(-monoolefins"
to read as - - a-monoolefins - -.
In column 2, line 41, delete hyphen in "organo-aluminium"
to read as - - organoaluminium - -.
In column 3, line 46, delete hyphen in "tert.butylper-pivalate" to read as - - tert.butylperpivalate - -.

UNITED STATES PATENT AND TRADEMARK OFFICE
CERTIFICATE OF CORRECTION

PATENT : 5,756,616
DATED : May 26, 1998
INVENTOR(S) : Gerhard Luft et al.

It is certified that error appears in the above-identified patent and that said Letters Patent is hereby corrected as shown below:

In column 4, Table 1 1st row 4th column, run in the word "Component B" with "Catalyst" to read as -- Catalyst Component B --.

In column 4, Table 1 7th column 4th line down, change "20" to -- 15 --.

In column 4, line 44, insert period in "tert-butylperpivalate" to read as -- tert.-butylperpivalate --.

Signed and Sealed this

Fifteenth Day of May, 2001

Attest:

NICHOLAS P. GODICI

Attesting Officer

Acting Director of the United States Patent and Trademark Office